(12) United States Patent
Taherzadeh Boroujeni et al.

(10) Patent No.: US 11,424,801 B2
(45) Date of Patent: Aug. 23, 2022

(54) TECHNIQUES FOR TRANSMITTING SIDELINK CHANNEL STATE INFORMATION FEEDBACK

(71) Applicant: QUALCOMM Incorporated, San Diego, CA (US)

(72) Inventors: Mahmoud Taherzadeh Boroujeni, San Diego, CA (US); Sony Akkarakaran, Poway, CA (US); Tao Luo, San Diego, CA (US); Junyi Li, Chester, NJ (US); Kapil Gulati, Montgomery, NJ (US)

(73) Assignee: QUALCOMM Incorporated, San Diego, CA (US)

(*) Notice: Subject to any disclaimer, the term of this patent is extended or adjusted under 35 U.S.C. 154(b) by 56 days.

(21) Appl. No.: 16/948,198

(22) Filed: Sep. 8, 2020

(65) Prior Publication Data
US 2021/0091837 A1    Mar. 25, 2021

Related U.S. Application Data

(60) Provisional application No. 62/903,285, filed on Sep. 20, 2019.

(51) Int. Cl.
*H04W 72/04* (2009.01)
*H04B 7/06* (2006.01)
(Continued)

(52) U.S. Cl.
CPC ......... *H04B 7/0626* (2013.01); *H04L 1/0026* (2013.01); *H04L 1/1819* (2013.01);
(Continued)

(58) Field of Classification Search
CPC ... H04B 7/0626; H04L 1/0026; H04L 5/0094; H04L 1/0029; H04W 72/0446; H04W 72/0453; H04W 76/27; H04W 92/18
See application file for complete search history.

(56) References Cited

U.S. PATENT DOCUMENTS

| 2013/0148515 A1* | 6/2013 | Ribeiro | ............... H04L 5/0094 370/252 |
| 2019/0149305 A1* | 5/2019 | Zhou | ................. H04L 5/0007 370/330 |

(Continued)

FOREIGN PATENT DOCUMENTS

WO    WO-2020146513 A1    7/2020

OTHER PUBLICATIONS

Fujitsu: "Discussion on Physical Layer Structure for NR Sidelink", 3GPP TSG RAN WG1 Ad-Hoc Meeting 1901, 3GPP Draft; R1-1900247 Discussion on Sidelink Physical Layer Structure for NR Sidelink_Final, 3rd Generation Partnership Project (3GPP), Mobile Competence Centre ; 650, Route Des Lucioles ; F-06921 SO, vol. RAN WG1, No. Taipei, Taiwan; Jan. 21, 2019-Jan. 25, 2019, Jan. 20, 2019 (Jan. 20, 2019), pp. 1-6, XP051593162, Retrieved from the Internet: URL: http://www.3gpp.org/ftp/Meetings%5F3GPP%5FSYNC/RAN1/Docs/R1%2D1900247%2Ezip [retrieved on Jan. 20, 2019], section 2.1, section 2.4.

(Continued)

*Primary Examiner* — Fahmida S Chowdhury
(74) *Attorney, Agent, or Firm* — Harrity and Harrity LLP

(57) ABSTRACT

Various aspects of the present disclosure generally relate to wireless communication. In some aspects, a user equipment (UE) may receive a sidelink channel state information (CSI) reference signal (CSI-RS). The UE may transmit, based at
(Continued)

least in part on the sidelink CSI-RS, a CSI report on a physical sidelink feedback channel. Numerous other aspects are provided.

30 Claims, 7 Drawing Sheets

(51) Int. Cl.
    *H04L 5/00*     (2006.01)
    *H04W 76/27*     (2018.01)
    *H04L 1/18*     (2006.01)
    *H04L 1/00*     (2006.01)
    *H04W 92/18*     (2009.01)

(52) U.S. Cl.
    CPC ....... *H04L 5/0051* (2013.01); *H04W 72/0446* (2013.01); *H04W 72/0453* (2013.01); *H04W 76/27* (2018.02); *H04W 92/18* (2013.01)

(56) References Cited

U.S. PATENT DOCUMENTS

| | | | |
|---|---|---|---|
| 2020/0022089 A1* | 1/2020 | Guo | H04W 52/346 |
| 2020/0029340 A1* | 1/2020 | He | H04W 72/02 |
| 2020/0196255 A1* | 6/2020 | Cheng | H04L 5/0033 |
| 2021/0266846 A1* | 8/2021 | Do | H04L 5/0048 |
| 2021/0345360 A1* | 11/2021 | Yeo | H04W 72/02 |
| 2021/0392620 A1* | 12/2021 | Ashraf | H04L 5/005 |

OTHER PUBLICATIONS

Huawei, et al., "Sidelink Physical Layer Structure for NR V2X", 3GPP TSG RAN WG1 Meeting #98, 3GPP Draft; R1-1908039_Final, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 26, 2019-Aug. 30, 2019, Aug. 17, 2019 (Aug. 17, 2019), 32 Pages, XP051764662, Retrieved from the Internet: URL: http://www.3gpp.org/ftp/tsg_ran/WG1_RL1 /TSG R1_98/ Docs/R1-1908039.zip [retrieved on Aug. 17, 2019], section 5.3.

International Search Report and Written Opinion—PCT/US2020/070514—ISA/EPO—dated Nov. 30, 2020.

Samsung: "Discussion on physical layer structures for NR V2X", 3GPP Draft; 3GPP TSG RAN WG1 #95, R1-1812984, 3rd Generation Partnership Project (3GPP), Mobile Competence Centre ; 650, Route Des Lucioles; F-06921 Sophia-Antipolis Cedex; France, vol. RAN WG1. No. Spokane, USA; Nov. 12, 2018-Nov. 16, 2018, Nov. 11, 2018 (Nov. 11, 2018), pp. 1-10, XP051554963, Retrieved from the Internet: URL: http://www.3gpp.org/ftp/Meetings%5F3GPP%5FSYNC/RAN1/Docs/R1%2D1812984%2Ezip [retrieved on Nov. 11, 2018], section 4.2.

* cited by examiner

TECHNIQUES FOR TRANSMITTING SIDELINK CHANNEL STATE INFORMATION FEEDBACK

CROSS-REFERENCE TO RELATED APPLICATION

This Patent Application claims priority to U.S. Provisional Patent Application No. 62/903,285, filed on Sep. 20, 2019, entitled "TECHNIQUES FOR TRANSMITTING SIDELINK CHANNEL STATE INFORMATION FEEDBACK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques for transmitting sidelink channel state information feedback.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a sidelink channel state information (CSI) reference signal (CSI-RS); and transmitting, based at least in part on the sidelink CSI-RS, a CSI report on a physical sidelink feedback channel (PSFCH).

In a first aspect, the method further comprises receiving a CSI report configuration in at least one of an RRC communication from a BS, an RRC communication from another UE, a PSBCH communication, or a PSCCH communication, and transmitting the CSI report comprises transmitting the CSI report based at least in part on the CSI report configuration. In a second aspect, alone or in combination with the first aspect, the CSI report configuration indicates that the CSI report is to be a compact CSI report, and transmitting the CSI report comprises transmitting a compact CSI report based at least in part on the CSI report configuration. In a third aspect, alone or in combination with one or more of the first and second aspects, the method includes transmitting hybrid automatic repeat request (HARM) feedback on the PSFCH with the compact CSI report. In a fourth aspect, alone or in combination with one or more of the first through third aspects, the CSI report comprises a compact CSI report and the compact CSI report includes one or two bits indicating a channel quality indicator that is based at least in part on the CSI-RS. In a fifth aspect, alone or in combination with one or more of the first through fourth aspects, the CSI report comprises a compact CSI report and the compact CSI report indicates that a non-compact CSI report is to be transmitted on another sidelink channel in a particular set of time-frequency resources.

In a sixth aspect, alone or in combination with one or more of the first through fifth aspects, the CSI report is in a sequence-based PSFCH format. In a seventh aspect, alone or in combination with one or more of the first through sixth aspects, transmitting the CSI report comprises transmitting the CSI report in the sequence-based PSFCH format with repetition across a plurality of symbols. In an eighth aspect, alone or in combination with one or more of the first through seventh aspects, the CSI report comprises a compact CSI report and the compact CSI report indicates CSI feedback that is differential to a previous compact CSI report.

In a ninth aspect, alone or in combination with one or more of the first through eighth aspects, the CSI report comprises a compact CSI report and the compact CSI report indicates CSI feedback that is differential to a previous non-compact CSI report. In a tenth aspect, alone or in combination with one or more of the first through ninth aspects, a periodicity of the compact CSI report and a periodicity of the non-compact CSI report are different periodicities. In an eleventh aspect, alone or in combination with one or more of the first through tenth aspects, the CSI report is in a non-sequence-based PSFCH format.

In a twelfth aspect, alone or in combination with one or more of the first through eleventh aspects, the CSI report is in a non-sequence-based PSFCH format that includes a plurality of coded bits of CSI feedback and one or more coded bits of HARQ feedback. In a thirteenth aspect, alone or in combination with one or more of the first through twelfth aspects, the CSI report is at least one of time division multiplexed on the PSFCH with one or more other CSI reports or frequency-division multiplexed on the PSFCH with one or more other CSI reports.

In some aspects, a method of wireless communication, performed by a UE, may include transmitting a sidelink CSI-RS; and receiving, based at least in part on the sidelink CSI-RS, a CSI report on a PSFCH.

In a first aspect, the method further comprises receiving HARQ feedback on the PSFCH with the CSI report. In a second aspect, alone or in combination with the first aspect, the CSI report comprises a compact CSI report, and the compact CSI report includes one or two bits indicating a channel quality indicator that is based at least in part on the CSI-RS. In a third aspect, alone or in combination with one or more of the first and second aspects, the CSI report comprises a compact CSI report, and the compact CSI report indicates that a non-compact CSI report is to be transmitted on another sidelink channel in a particular set of time-frequency resources.

In a fourth aspect, alone or in combination with one or more of the first through third aspects, the CSI report is in a sequence-based PSFCH format. In a fifth aspect, alone or in combination with one or more of the first through fourth aspects, receiving the CSI report comprises receiving the CSI report in the sequence-based PSFCH format with repetition across a plurality of symbols. In a sixth aspect, alone or in combination with one or more of the first through fifth aspects, the CSI report comprises a compact CSI report, and the compact CSI report indicates CSI feedback that is differential to a previous compact CSI report.

In a seventh aspect, alone or in combination with one or more of the first through sixth aspects, the CSI report comprises a compact CSI report, and the compact CSI report indicates CSI feedback that is differential to a previous non-compact CSI report. In an eighth aspect, alone or in combination with one or more of the first through seventh aspects, a periodicity of the compact CSI report and a periodicity of the non-compact CSI report are different periodicities. In a ninth aspect, alone or in combination with one or more of the first through eighth aspects, the CSI report is in a non-sequence-based PSFCH format.

In a tenth aspect, alone or in combination with one or more of the first through ninth aspects, the CSI report is in a non-sequence-based PSFCH format that includes a plurality of coded bits of CSI feedback and one or more coded bits of HARQ feedback. In an eleventh aspect, alone or in combination with one or more of the first through tenth aspects, the CSI report is at least one of time division multiplexed on the PSFCH with one or more other CSI reports or frequency-division multiplexed on the PSFCH with one or more other CSI reports.

In some aspects, a UE for wireless communication may include memory and one or more processors coupled to the memory. The memory and the one or more processors may be configured to receive a sidelink CSI-RS; and transmit, based at least in part on the sidelink CSI-RS, a CSI report on a PSFCH.

In a first aspect, the one or more processors are further configured to receive a CSI report configuration in at least one of an RRC communication from a BS, an RRC communication from another UE, a PSBCH communication, or a PSCCH communication, and the one or more processors, when transmitting the CSI report, are to transmit the CSI report based at least in part on the CSI report configuration. In a second aspect, alone or in combination with the first aspect, the CSI report configuration indicates that the CSI report is to be a compact CSI report, and the one or more processors, when transmitting the CSI report, are to transmit a compact CSI report based at least in part on the CSI report configuration.

In a third aspect, alone or in combination with one or more of the first and second aspects, the one or more processors are further configured to transmit HARQ feedback on the PSFCH with the compact CSI report. In a fourth aspect, alone or in combination with one or more of the first through third aspects, the CSI report comprises a compact CSI report, and the compact CSI report includes one or two bits indicating a channel quality indicator that is based at least in part on the CSI-RS. In a fifth aspect, alone or in combination with one or more of the first through fourth aspects, the CSI report comprises a compact CSI report, and the compact CSI report indicates that a non-compact CSI report is to be transmitted on another sidelink channel in a particular set of time-frequency resources.

In a sixth aspect, alone or in combination with one or more of the first through fifth aspects, the CSI report is in a sequence-based PSFCH format. In a seventh aspect, alone or in combination with one or more of the first through sixth aspects, the one or more processors, when transmitting the CSI report, are to transmit the CSI report in the sequence-based PSFCH format with repetition across a plurality of symbols. In an eighth aspect, alone or in combination with one or more of the first through seventh aspects, the CSI report comprises a compact CSI report, and the compact CSI report indicates CSI feedback that is differential to a previous compact CSI report.

In a ninth aspect, alone or in combination with one or more of the first through eighth aspects, the CSI report comprises a compact CSI report, and the compact CSI report indicates CSI feedback that is differential to a previous non-compact CSI report. In a tenth aspect, alone or in combination with one or more of the first through ninth aspects, a periodicity of the compact CSI report and a periodicity of the non-compact CSI report are different periodicities. In an eleventh aspect, alone or in combination with one or more of the first through tenth aspects, the CSI report is in a non-sequence-based PSFCH format.

In a twelfth aspect, alone or in combination with one or more of the first through eleventh aspects, the CSI report is in a non-sequence-based PSFCH format that includes a plurality of coded bits of CSI feedback and one or more coded bits of HARQ feedback. In a thirteenth aspect, alone or in combination with one or more of the first through twelfth aspects, the CSI report is at least one of time division multiplexed on the PSFCH with one or more other CSI reports or frequency-division multiplexed on the PSFCH with one or more other CSI reports.

In some aspects, a UE for wireless communication may include memory and one or more processors coupled to the memory. The memory and the one or more processors may be configured to transmit a sidelink CSI-RS; and receive, based at least in part on the sidelink CSI-RS, a CSI report on a PSFCH.

In a first aspect, the one or more processors are further configured to receive HARQ feedback on the PSFCH with the CSI report. In a second aspect, alone or in combination with the first aspect, the CSI report comprises a compact CSI report, and the compact CSI report includes one or two bits indicating a channel quality indicator that is based at least in part on the CSI-RS. In a third aspect, alone or in combination with one or more of the first and second aspects, the CSI report comprises a compact CSI report, and the compact CSI report indicates that a non-compact CSI report is to be transmitted on another sidelink channel in a particular set of time-frequency resources.

In a fourth aspect, alone or in combination with one or more of the first through third aspects, the CSI report is in a sequence-based PSFCH format. In a fifth aspect, alone or in combination with one or more of the first through fourth aspects, the one or more processors, when receiving the CSI report, are to receive the CSI report in the sequence-based PSFCH format with repetition across a plurality of symbols. In a sixth aspect, alone or in combination with one or more of the first through fifth aspects, the CSI report comprises a compact CSI report, and the compact CSI report indicates CSI feedback that is differential to a previous compact CSI report.

In a seventh aspect, alone or in combination with one or more of the first through sixth aspects, the CSI report comprises a compact CSI report, and the compact CSI report indicates CSI feedback that is differential to a previous non-compact CSI report. In an eighth aspect, alone or in combination with one or more of the first through seventh aspects, a periodicity of the compact CSI report and a periodicity of the non-compact CSI report are different periodicities. In a ninth aspect, alone or in combination with one or more of the first through eighth aspects, the CSI report is in a non-sequence-based PSFCH format.

In a tenth aspect, alone or in combination with one or more of the first through ninth aspects, the CSI report is in a non-sequence-based PSFCH format that includes a plurality of coded bits of CSI feedback and one or more coded bits of HARQ feedback. In an eleventh aspect, alone or in combination with one or more of the first through tenth aspects, the CSI report is at least one of time division multiplexed on the PSFCH with one or more other CSI reports or frequency-division multiplexed on the PSFCH with one or more other CSI reports.

In some aspects, a non-transitory computer-readable medium may store one or more instructions for wireless communication. The one or more instructions, when executed by one or more processors of a UE, may cause the one or more processors to: receive a sidelink CSI-RS; and transmit, based at least in part on the sidelink CSI-RS, a CSI report on a PSFCH.

In a first aspect, the one or more instructions, when executed by the one or more processors, further cause the one or more processors to receive a CSI report configuration in at least one of an RRC communication from a BS, an RRC communication from another UE, a PSBCH communication, or a PSCCH communication, and the one or more instructions, that cause the one or more processors to transmit the CSI report, cause the one or more processors to transmit the CSI report based at least in part on the CSI report configuration. In a second aspect, alone or in combination with the first aspect, the CSI report configuration indicates that the CSI report is to be a compact CSI report, and the one or more instructions, that cause the one or more processors to transmit the CSI report, cause the one or more processors to transmit a compact CSI report based at least in part on the CSI report configuration.

In a third aspect, alone or in combination with one or more of the first and second aspects, the one or more instructions, when executed by the one or more processors, further cause the one or more processors to transmit HARQ feedback on the PSFCH with the compact CSI report. In a fourth aspect, alone or in combination with one or more of the first through third aspects, the CSI report comprises a compact CSI report, and the compact CSI report includes one or two bits indicating a channel quality indicator that is based at least in part on the CSI-RS. In a fifth aspect, alone or in combination with one or more of the first through fourth aspects, the CSI report comprises a compact CSI report, and the compact CSI report indicates that a non-compact CSI report is to be transmitted on another sidelink channel in a particular set of time-frequency resources.

In a sixth aspect, alone or in combination with one or more of the first through fifth aspects, the CSI report is in a sequence-based PSFCH format. In a seventh aspect, alone or in combination with one or more of the first through sixth aspects, the one or more instructions, that cause the one or more processors to transmit the CSI report, cause the one or more processors to transmit the CSI report in the sequence-based PSFCH format with repetition across a plurality of symbols. In an eighth aspect, alone or in combination with one or more of the first through seventh aspects, the CSI report comprises a compact CSI report, and the compact CSI report indicates CSI feedback that is differential to a previous compact CSI report.

In a ninth aspect, alone or in combination with one or more of the first through eighth aspects, the CSI report comprises a compact CSI report, and the compact CSI report indicates CSI feedback that is differential to a previous non-compact CSI report. In a tenth aspect, alone or in combination with one or more of the first through ninth aspects, a periodicity of the compact CSI report and a periodicity of the non-compact CSI report are different periodicities. In an eleventh aspect, alone or in combination with one or more of the first through tenth aspects, the CSI report is in a non-sequence-based PSFCH format.

In a twelfth aspect, alone or in combination with one or more of the first through eleventh aspects, the CSI report is in a non-sequence-based PSFCH format that includes a plurality of coded bits of CSI feedback and one or more coded bits of hybrid automatic repeat request feedback. In a thirteenth aspect, alone or in combination with one or more of the first through twelfth aspects, the CSI report is at least one of time division multiplexed on the PSFCH with one or more other CSI reports or frequency-division multiplexed on the PSFCH with one or more other CSI reports.

In some aspects, a non-transitory computer-readable medium may store one or more instructions for wireless communication. The one or more instructions, when executed by one or more processors of a UE, may cause the one or more processors to: transmit a sidelink CSI-RS; and receive, based at least in part on the sidelink CSI-RS, a CSI report on a PSFCH.

In a first aspect, the one or more instructions, when executed by the one or more processors, further cause the one or more processors to receive HARQ feedback on the PSFCH with the CSI report. In a second aspect, alone or in combination with the first aspect, the CSI report comprises a compact CSI report, and the compact CSI report includes one or two bits indicating a channel quality indicator that is based at least in part on the CSI-RS. In a third aspect, alone or in combination with one or more of the first and second aspects, the CSI report comprises a compact CSI report, and the compact CSI report indicates that a non-compact CSI report is to be transmitted on another sidelink channel in a particular set of time-frequency resources.

In a fourth aspect, alone or in combination with one or more of the first through third aspects, the CSI report is in a sequence-based PSFCH format. In a fifth aspect, alone or in combination with one or more of the first through fourth aspects, the one or more instructions, that cause the one or more processors to receive the CSI report, cause the one or more processors to receive the CSI report in the sequence-based PSFCH format with repetition across a plurality of symbols. In a sixth aspect, alone or in combination with one or more of the first through fifth aspects, the CSI report comprises a compact CSI report, and the compact CSI report indicates CSI feedback that is differential to a previous compact CSI report.

In a seventh aspect, alone or in combination with one or more of the first through sixth aspects, the CSI report comprises a compact CSI report, and the compact CSI report indicates CSI feedback that is differential to a previous non-compact CSI report. In an eighth aspect, alone or in combination with one or more of the first through seventh aspects, a periodicity of the compact CSI report and a periodicity of the non-compact CSI report are different periodicities. In a ninth aspect, alone or in combination with one or more of the first through eighth aspects, the CSI report is in a non-sequence-based PSFCH format.

In a tenth aspect, alone or in combination with one or more of the first through ninth aspects, the CSI report is in a non-sequence-based PSFCH format that includes a plurality of coded bits of CSI feedback and one or more coded bits of hybrid automatic repeat request feedback. In an eleventh aspect, alone or in combination with one or more of the first through tenth aspects, the CSI report is at least one of time division multiplexed on the PSFCH with one or more other CSI reports or frequency-division multiplexed on the PSFCH with one or more other CSI reports.

In some aspects, an apparatus for wireless communication may include means for receiving a sidelink CSI-RS; and means for transmitting, based at least in part on the sidelink CSI-RS, a CSI report on a PSFCH.

In a first aspect, the apparatus further comprises means for receiving a CSI report configuration in at least one of an RRC communication from a B S, an RRC communication from another apparatus, a PSBCH communication, or a PSCCH communication, and means for transmitting the CSI report comprises means for transmitting the CSI report based at least in part on the CSI report configuration. In a second aspect, alone or in combination with the first aspect, the CSI report configuration indicates that the CSI report is to be a compact CSI report, and the means for transmitting the CSI report comprises means for transmitting a compact CSI report based at least in part on the CSI report configuration.

In a third aspect, alone or in combination with one or more of the first and second aspects, the apparatus includes means for transmitting HARQ feedback on the PSFCH with the compact CSI report. In a fourth aspect, alone or in combination with one or more of the first through third aspects, the CSI report comprises a compact CSI report, and the compact CSI report includes one or two bits indicating a channel quality indicator that is based at least in part on the CSI-RS. In a fifth aspect, alone or in combination with one or more of the first through fourth aspects, the CSI report comprises a compact CSI report, and the compact CSI report indicates that a non-compact CSI report is to be transmitted on another sidelink channel in a particular set of time-frequency resources.

In a sixth aspect, alone or in combination with one or more of the first through fifth aspects, the CSI report is in a sequence-based PSFCH format. In a seventh aspect, alone or in combination with one or more of the first through sixth aspects, the means for transmitting the CSI report comprises means for transmitting the CSI report in the sequence-based PSFCH format with repetition across a plurality of symbols. In an eighth aspect, alone or in combination with one or more of the first through seventh aspects, the CSI report comprises a compact CSI report, and the compact CSI report indicates CSI feedback that is differential to a previous compact CSI report.

In a ninth aspect, alone or in combination with one or more of the first through eighth aspects, the CSI report comprises a compact CSI report, and the compact CSI report indicates CSI feedback that is differential to a previous non-compact CSI report. In a tenth aspect, alone or in combination with one or more of the first through ninth aspects, a periodicity of the compact CSI report and a periodicity of the non-compact CSI report are different periodicities. In an eleventh aspect, alone or in combination with one or more of the first through tenth aspects, the CSI report is in a non-sequence-based PSFCH format.

In a twelfth aspect, alone or in combination with one or more of the first through eleventh aspects, the CSI report is in a non-sequence-based PSFCH format that includes a plurality of coded bits of CSI feedback and one or more coded bits of hybrid automatic repeat request feedback. In a thirteenth aspect, alone or in combination with one or more of the first through twelfth aspects, the CSI report is at least one of time division multiplexed on the PSFCH with one or more other CSI reports or frequency-division multiplexed on the PSFCH with one or more other CSI reports.

In some aspects, an apparatus for wireless communication may include means for transmitting a sidelink CSI-RS; and means for receiving, based at least in part on the sidelink CSI-RS, a CSI report on a PSFCH.

In a first aspect, the apparatus further comprises means for receiving HARQ feedback on the PSFCH with the CSI report. In a second aspect, alone or in combination with the first aspect, the CSI report comprises a compact CSI report, and the compact CSI report includes one or two bits indicating a channel quality indicator that is based at least in part on the CSI-RS. In a third aspect, alone or in combination with one or more of the first and second aspects, the CSI report comprises a compact CSI report, and the compact CSI report indicates that a non-compact CSI report is to be transmitted on another sidelink channel in a particular set of time-frequency resources.

In a fourth aspect, alone or in combination with one or more of the first through third aspects, the CSI report is in a sequence-based PSFCH format. In a fifth aspect, alone or in combination with one or more of the first through fourth aspects, the means for receiving the CSI report comprises means for receiving the CSI report in the sequence-based PSFCH format with repetition across a plurality of symbols. In a sixth aspect, alone or in combination with one or more of the first through fifth aspects, the CSI report comprises a compact CSI report, and the compact CSI report indicates CSI feedback that is differential to a previous compact CSI report.

In a seventh aspect, alone or in combination with one or more of the first through sixth aspects, the CSI report comprises a compact CSI report, and the compact CSI report indicates CSI feedback that is differential to a previous non-compact CSI report. In an eighth aspect, alone or in combination with one or more of the first through seventh aspects, a periodicity of the compact CSI report and a periodicity of the non-compact CSI report are different periodicities. In a ninth aspect, alone or in combination with one or more of the first through eighth aspects, the CSI report is in a non-sequence-based PSFCH format.

In a tenth aspect, alone or in combination with one or more of the first through ninth aspects, the CSI report is in a non-sequence-based PSFCH format that includes a plurality of coded bits of CSI feedback and one or more coded bits of hybrid automatic repeat request feedback. In an eleventh aspect, alone or in combination with one or more of the first through tenth aspects, the CSI report is at least one of time division multiplexed on the PSFCH with one or more other CSI reports or frequency-division multiplexed on the PSFCH with one or more other CSI reports.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
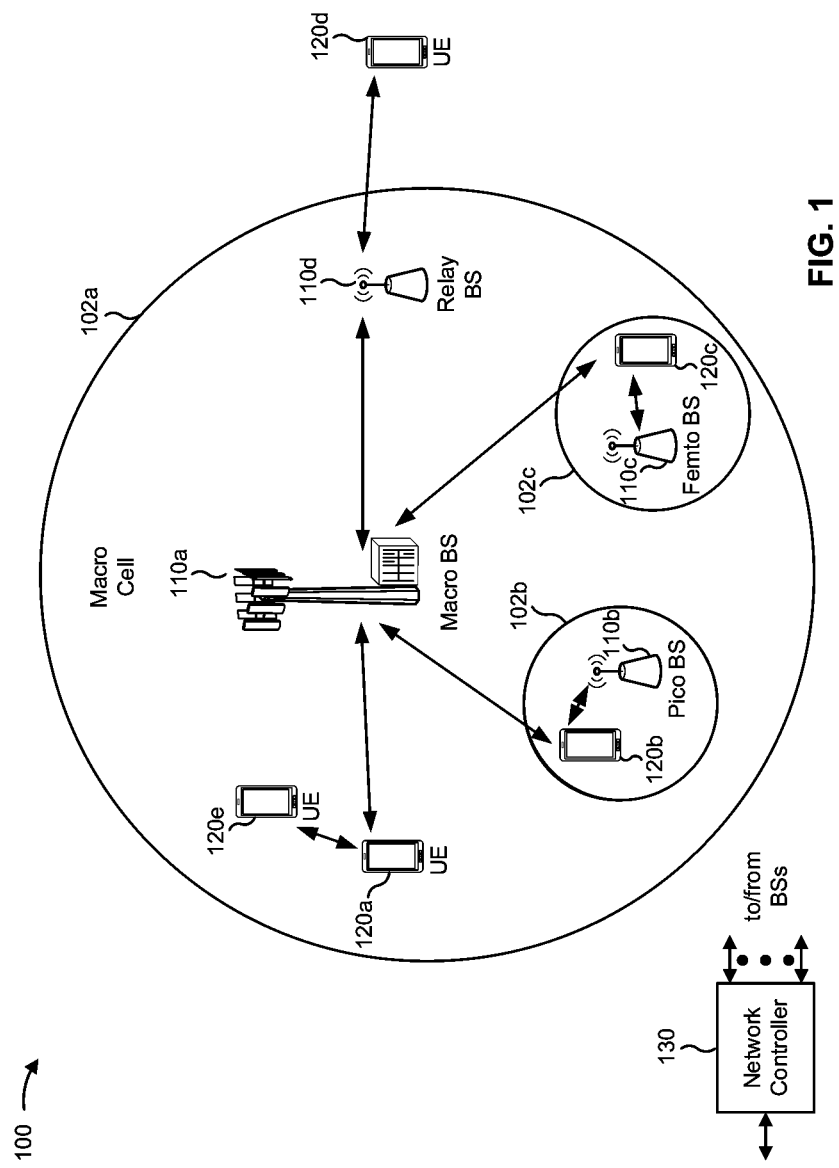
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
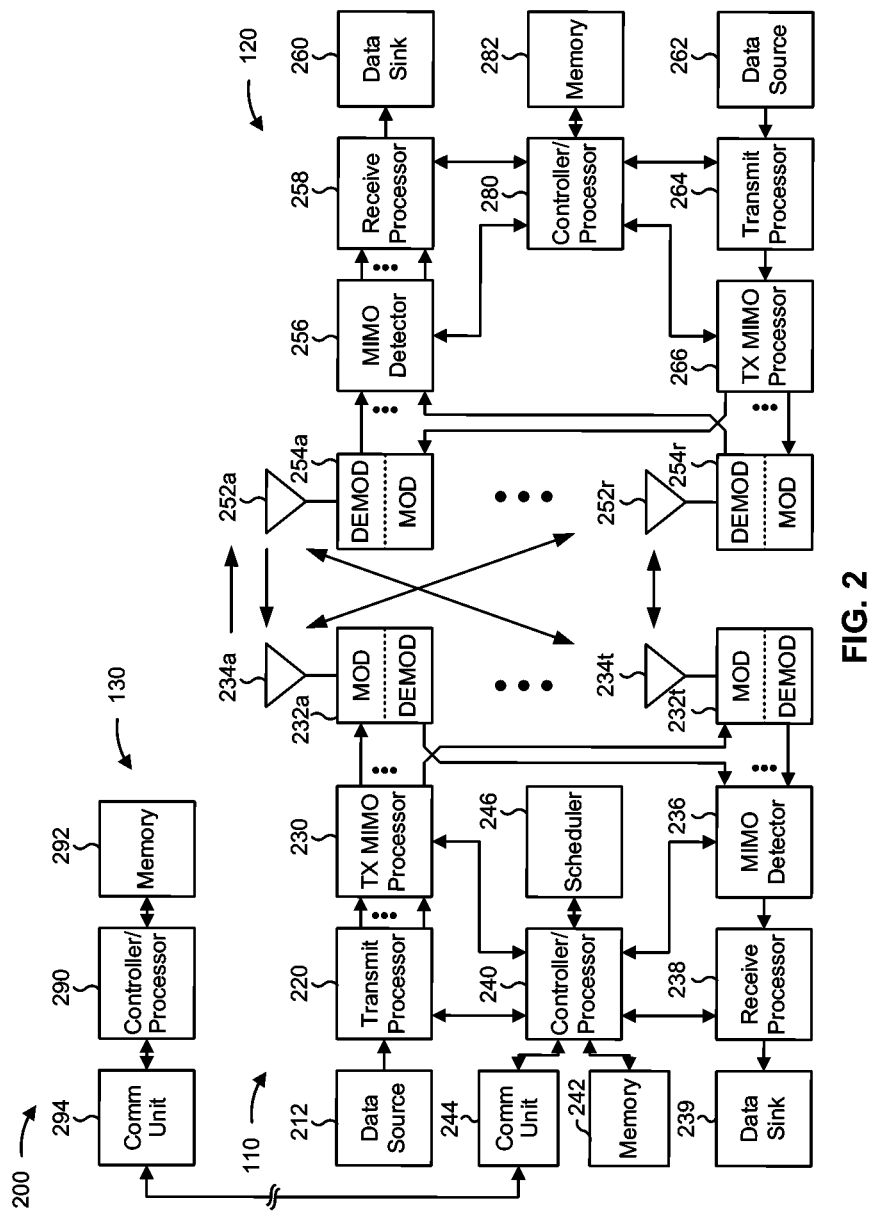
FIG. 2 is a diagram illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmitting sidelink channel state information feedback, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving a sidelink channel state information (CSI) reference signal (CSI-RS), means for transmitting, based at least in part on the sidelink CSI-RS, a CSI report on a physical sidelink feedback channel (PSFCH), and/or the like. In some aspects, UE 120 may include means for transmitting a CSI-RS, means for receiving, based at least in part on the sidelink CSI-RS, a CSI report on a PSFCH, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

As indicated above, in some cases, two or more UEs may communicate directly via a sidelink. For example, a first UE may transmit one or more sidelink communications to a second UE on the sidelink and/or may receive one or more sidelink communications from the second UE on the sidelink. If a UE does not have CSI feedback associated with a scheduled sidelink communication, the UE may be unable to configure transmission parameters for the sidelink communication based at least in part on sidelink channel conditions on the frequency-domain resources in which the sidelink communication is scheduled.

Some aspects describe herein provide techniques for scheduling a front-loaded sidelink CSI-RS. In some aspects, a first UE may be configured to transmit a sidelink CSI-RS to a second UE. The second UE may receive the sidelink CSI-RS, may generate CSI feedback based at least in part on the sidelink CSI-RS, and may provide the CSI feedback to the first UE in a CSI report. The second UE may transmit the CSI report to the first UE on a PSFCH.

In some aspects, the CSI report may be a non-compact CSI report that includes a full set of CSI feedback, such as a channel quality indicator (CQI), a precoding matrix indicator (PMI), a CSI-RS resource indicator (CRI), a strongest layer indication (SLI), a rank indication (RI), a layer one RSRP (L1-RSRP) for beam management, and/or other CSI feedback. In some aspects, the CSI report may be a compact CSI report, which may be smaller in size relative to a non-compact CSI report. For example, a compact CSI report may be one or two bits in size (or another relatively small number of bits), whereas a non-compact CSI report may be 20 bits in size (or another relatively large number of bits). In this case, the compact CSI report may include a subset of CSI feedback that may be typically included in a non-compact CSI report, may include an indication that the first UE is to transmit a non-compact CSI report in another set of time-frequency resources and/or on another sidelink channel, and/or the like.

In this way, the first UE may receive the CSI feedback on the PSFCH and may configure transmission parameters for sidelink communications that are to be transmitted by the first UE, which increases the efficiency of the sidelink communications, increases the reliability of the sidelink communications, increases the signal quality of the second sidelink communications, and/or the like.

Figure 3:
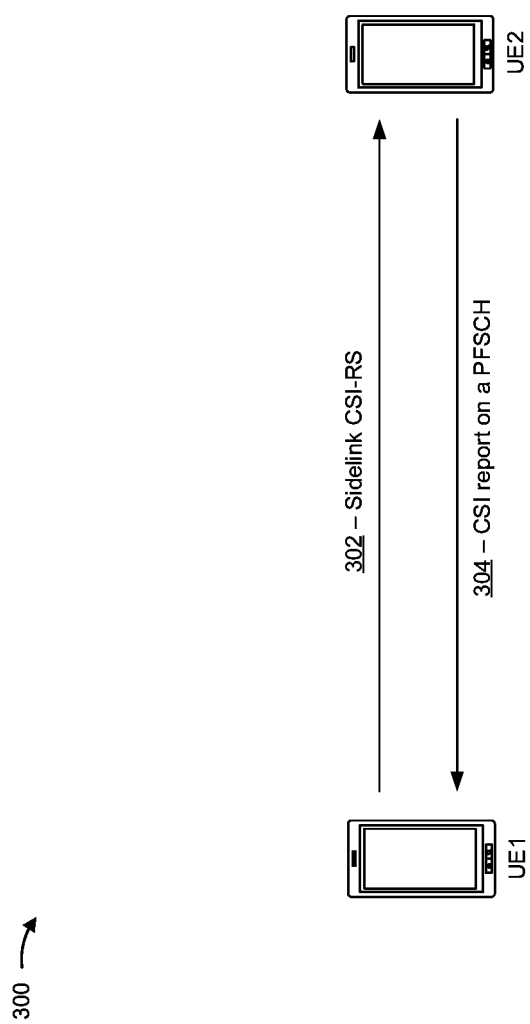
FIG. 3 is a diagram illustrating an example of transmitting sidelink channel state information feedback, in accordance with various aspects of the present disclosure.

FIG. 3 is a diagram illustrating one or more examples 300 of transmitting sidelink channel state information feedback, in accordance with various aspects of the present disclosure. As shown in FIG. 3, example(s) 300 may include sidelink communication between a plurality of UEs (e.g., UEs 120), such as UE1, UE2, and/or the like.

As shown in FIG. 3, and by reference number 302, UE1 may transmit a sidelink CSI-RS to UE2. In some aspects, UE1 may further transmit a sidelink communication to UE2 on a sidelink channel (e.g., a physical sidelink control channel (PSCCH), a physical sidelink shared channel (PSSCH), and/or the like). In some aspects, UE1 may transmit the sidelink CSI-RS based at least in part on being scheduled or configured to transmit the sidelink communication to UE2. In some aspects, UE1 may transmit the sidelink CSI-RS so that UE2 may generate a CSI report based at least in part on the sidelink CSI-RS, and so that UE1 may configure one or more transmission parameters (e.g., modulation coding scheme, transport block size, number of MIMO layers, and/or other channel processing parameters) for transmitting subsequent sidelink communications to UE2.

In some aspects, UE1 may transmit the sidelink CSI-RS on a sidelink channel. The sidelink channel may be the same sidelink channel or a different sidelink channel on which UE1 is to transmit the sidelink communication. In some aspects, UE1 may transmit the sidelink CSI-RS in a set of time-domain resources (e.g., one or more slots, one or more symbols, and/or the like) and/or in a set of frequency-domain resources (e.g., one or more frequency carriers, one or more subcarriers, and/or the like). In some aspects, the set of time-domain resources may be the same as a set of time-domain resources configured for the sidelink communication or may be different from the set of time-domain resources configured for the sidelink communication. In some aspects, the set of frequency-domain resources may be the same as a set of frequency-domain resources configured for the sidelink communication or may be different from the set of frequency-domain resources configured for the sidelink communication.

As further shown in FIG. 3, and by reference number 304, UE2 may receive the sidelink CSI-RS from UE1 and may transmit a CSI report on a PFSCH to UE1. In some aspects, UE2 may generate the CSI report based at least in part on the sidelink CSI-RS. For example, UE2 may perform one or more measurements and may generate the CSI report to include CSI feedback that is based at least in part on the sidelink CSI-RS. The CSI feedback may include a CQI, a PMI, a CRI, an SLI, an RI, an L1-RSRP for beam management, and/or other CSI feedback that is based at least in part on the sidelink CSI-RS. UE2 may generate the CSI feedback by performing one or more measurements of the sidelink CSI-RS (e.g., one or more RSRP measurements, one or more RSSI measurements, one or more RSRQ measurements, one or more CQI measurements, one or more pathloss measurements, and/or other types of signal measurements) and generating the CSI feedback based at least in part on the results of the one or more measurements.

In some aspects, UE2 may transmit the CSI report along with other CSI reports to one or more other UEs. In this case, UE2 may multiplex the CSI report with the other CSI reports when transmitting the CSI report and the other CSI reports. For example, UE2 may multiplex the CSI report with the other CSI reports in the time domain (e.g., such that the CSI report with the other CSI reports are time division multiplexed) and/or the frequency domain (e.g., such that the CSI report with the other CSI reports are frequency division multiplexed).

In some aspects, UE2 may generate and/or transmit the CSI report based at least in part on a CSI report configuration. UE2 may receive the CSI report configuration from UE1, from another UE, from a BS (e.g., a serving BS and/or another BS), and/or the like. In some aspects, UE2 may receive the CSI report configuration in a radio resource control (RRC) communication, a PSCCH communication, a physical downlink control channel (PDCCH) communication, a physical sidelink broadcast channel (PSBCH) communication, a downlink control information (DCI) communication, a sidelink control information (SCI) communication, a medium access control control element (MAC-CE) communication, and/or another type of communication.

In some aspects, the CSI report configuration may indicate that UE2 is to generate and transmit a non-compact CSI report. In this case, UE2 may generate and transmit, on the PFSCH, a CSI report that includes a full set of CSI feedback. In some aspects, the CSI report configuration may indicate that UE2 is to generate and transmit a compact CSI report. In this case, UE2 may generate and transmit, on the PFSCH, a CSI report that includes a subset of CSI feedback that is included in a non-compact CSI report (e.g., a CQI only, a CQI and an RI only, and/or the like).

In some aspects, the CSI report configuration may indicate that UE2 is to generate and transmit a compact CSI report and a non-compact CSI report. For example, the CSI report configuration may indicate that UE2 is to transmit the compact CSI report on the PFSCH and the non-compact CSI report on another sidelink channel (e.g., a PSCCH, PSSCH, and/or the like) and in a particular set of time-frequency resources (e.g., a set of time-frequency resources configured to carry non-compact CSI reports). In this case, UE2 may transmit the compact CSI report on the PFSCH and the non-compact CSI report on another sidelink channel and in the particular set of time-frequency resources. Moreover, UE2 may generate and transmit the compact CSI report such that the compact CSI report includes an indication that UE2 is to transmit the non-compact CSI report on the other sidelink channel and in the particular set of time-frequency resources.

In some aspects, the CSI report configuration may indicate that UE2 is to use differential CSI reporting when transmitting non-compact CSI reports and compact CSI reports. In this case, UE2 may transmit a non-compact CSI report that includes a full set of CSI feedback, and may transmit one or more subsequent compact CSI reports that indicate CSI feedback as a differential to the CSI feedback included in the non-compact CSI report (e.g., that indicate changes to the CSI feedback in the non-compact CSI report as opposed to explicit CSI feedback values). In some aspects, a compact CSI report may indicate changes to the CSI feedback in a non-compact CSI report by indicating changes in values to the original CSI feedback included in the non-compact CSI report (in which case the compact CSI report indicates CSI feedback that is differential to a previous non-compact CSI report), or by indicating changes to a previously transmitted compact CSI report (in which case the compact CSI report indicates CSI feedback that is differential to a previous compact CSI report).

In some aspects, the periodicity at which non-compact CSI reports are transmitted may be the same as or different from the periodicity at which compact CSI reports are transmitted. For example, the CSI report configuration may indicate that UE2 is to transmit a non-compact CSI report (e.g., which may be referred to as a non-differential CSI report for purposes of differential CSI reporting) at an interval of every 20 slots, and may indicate that UE2 is to transmit a compact CSI report (e.g., which may be referred to as a differential CSI report for purposes of differential CSI reporting) at an interval of every slot.

In some aspects, the CSI report configuration may indicate that UE2 is to generate and transmit a CSI report that is in a sequence-based PSFCH format. In this case, UE2 may transmit the CSI report in the sequence-based PSFCH format with repetition across a plurality of symbols or without repetition. In some aspects, the CSI report configuration may indicate that UE2 is to generate and transmit a CSI report that is in a non-sequence-based PSFCH format (e.g., an X-symbol PFSCH format and/or another type of non-sequence-based PSFCH format). In this case, UE2 may transmit the CSI report in the non-sequence-based PSFCH format with repetition across a plurality of symbols or without repetition.

In some aspects, the CSI report configuration may indicate that UE2 is to generate and transmit a CSI report that is in a PFSCH format that includes a plurality of coded bits of CSI feedback (e.g., one or two bits, 20 bits, and/or the like) and one or more coded bits of hybrid automatic repeat request (HARQ) feedback associated with the sidelink communication transmitted by UE1 (e.g., an indication of an acknowledgement (ACK) or negative acknowledgement (NACK) associated with the sidelink communication). In this case, UE2 may generate and transmit, to UE1 and on the PFSCH, the CSI report and the HARQ feedback in the PFSCH format.

In some aspects, UE1 may receive the CSI report and may configure one or more transmission parameters for subsequent sidelink communications based at least in part on the CSI feedback included in the CSI report. In some aspects, UE1 may receive the CSI report, may identify an indication in the CSI report that UE2 is to transmit a non-compact CSI report to UE1, and may monitor a set of time-frequency resources on another sidelink channel for the non-compact CSI report. In some aspects, UE1 may receive the HARQ feedback from UE2 and may perform one or more retransmissions of the sidelink communication based at least in part on the HARQ feedback.

In this way, UE1 may be configured to transmit a sidelink CSI-RS to UE2. UE2 may receive the sidelink CSI-RS, may generate CSI feedback based at least in part on the sidelink CSI-RS, and may provide the CSI feedback to UE1 in a CSI report. UE2 may transmit the CSI report to UE1 on a PSFCH. The CSI report may be a compact CSI report, may be a non-compact CSI report, may indicate that UE2 is to transmit a non-compact CSI report to UE1 in a different set of time-frequency resources, and/or the like. In this way, UE1 may receive the CSI feedback on the PSFCH and may configure transmission parameters for sidelink communications that are to be transmitted by UE1, which increases the efficiency of the sidelink communications, increases the reliability of the sidelink communications, increases the signal quality of the second sidelink communications, and/or the like.

Figure 4:
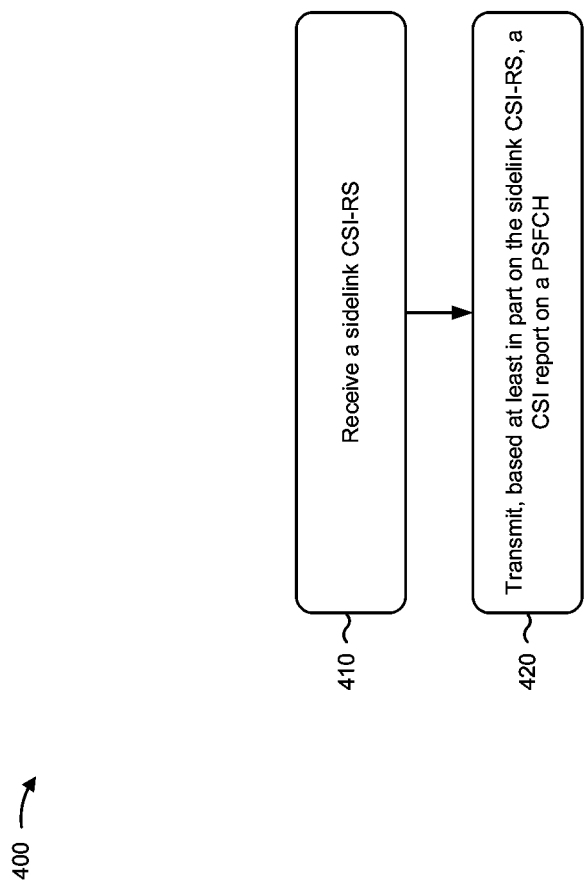
FIGS. 4 and 5 are diagrams illustrating example processes performed, for example, by a UE, in accordance with various aspects of the present disclosure.

As indicated above, FIG. 3 is provided as one or more examples. Other examples may differ from what is described with respect to FIG. 3. FIG. 4 is a diagram illustrating an example process 400 performed, for example, by a UE, in accordance with various aspects of the present disclosure. Example process 400 is an example where the UE (e.g., UE 120) performs operations associated with techniques for transmitting sidelink CSI feedback.

As shown in FIG. 4, in some aspects, process 400 may include receiving a sidelink CSI-RS (block 410). For example, the UE (e.g., using antenna 252, DEMOD 254, MIMO detector 256, receive processor 258, controller/processor 280, memory 282, reception component 604 of FIG. 6, and/or the like) may receive a sidelink CSI-RS, as described above.

As further shown in FIG. 4, in some aspects, process 400 may include transmitting, based at least in part on the sidelink CSI-RS, a CSI report on a PSFCH (block 420). For example, the UE (e.g., using antenna 252, MOD 254, transmit processor 264, Tx MIMO processor 266, controller/processor 280, memory 282, transmission component 608 of FIG. 6, and/or the like) may transmit, based at least in part on the sidelink CSI-RS, a CSI report on a PSFCH, as described above.

Process 400 may include additional aspects, such as any single aspect or any combination of aspects described below and/or in connection with one or more other processes described elsewhere herein.

In a first aspect, process 400 further comprises receiving (e.g., using antenna 252, DEMOD 254, MIMO detector 256, receive processor 258, controller/processor 280, memory 282, reception component 604, and/or the like) a CSI report configuration in at least one of an RRC communication from a BS, an RRC communication from another UE, a PSBCH communication, or a PSCCH communication, and transmitting the CSI report comprises transmitting (e.g., using controller/processor 280, transmit processor 264, TX MIMO processor 266, MOD 254, antenna 252, memory 282, transmission component 608, and/or the like) the CSI report based at least in part on the CSI report configuration. In a second aspect, alone or in combination with the first aspect, the CSI report configuration indicates that the CSI report is to be a compact CSI report, and transmitting the CSI report comprises transmitting a compact CSI report based at least in part on the CSI report configuration.

In a third aspect, alone or in combination with one or more of the first and second aspects, process 400 includes transmitting (e.g., using controller/processor 280, transmit processor 264, TX MIMO processor 266, MOD 254, antenna 252, memory 282, transmission component 608, and/or the like) HARQ feedback on the PSFCH with the compact CSI report. In a fourth aspect, alone or in combination with one or more of the first through third aspects, the CSI report comprises a compact CSI report, and the compact CSI report includes one or two bits indicating a channel quality indicator that is based at least in part on the CSI-RS. In a fifth aspect, alone or in combination with one or more of the first through fourth aspects, the CSI report comprises a compact CSI report, and the compact CSI report indicates that a non-compact CSI report is to be transmitted on another sidelink channel in a particular set of time-frequency resources.

In a sixth aspect, alone or in combination with one or more of the first through fifth aspects, the CSI report is in a sequence-based PSFCH format. In a seventh aspect, alone or in combination with one or more of the first through sixth aspects, transmitting the CSI report comprises transmitting (e.g., using controller/processor 280, transmit processor 264, TX MIMO processor 266, MOD 254, antenna 252, memory 282, transmission component 608, and/or the like) the CSI report in the sequence-based PSFCH format with repetition across a plurality of symbols. In an eighth aspect, alone or in combination with one or more of the first through seventh aspects, the CSI report comprises a compact CSI report, and the compact CSI report indicates CSI feedback that is differential to a previous compact CSI report.

In a ninth aspect, alone or in combination with one or more of the first through eighth aspects, the CSI report comprises a compact CSI report, and the compact CSI report indicates CSI feedback that is differential to a previous non-compact CSI report. In a tenth aspect, alone or in combination with one or more of the first through ninth aspects, a periodicity of the compact CSI report and a periodicity of the non-compact CSI report are different periodicities. In an eleventh aspect, alone or in combination with one or more of the first through tenth aspects, the CSI report is in a non-sequence-based PSFCH format.

In a twelfth aspect, alone or in combination with one or more of the first through eleventh aspects, the CSI report is in a non-sequence-based PSFCH format that includes a plurality of coded bits of CSI feedback and one or more coded bits of HARQ feedback. In a thirteenth aspect, alone or in combination with one or more of the first through twelfth aspects, the CSI report is at least one of time division multiplexed on the PSFCH with one or more other CSI reports or frequency-division multiplexed on the PSFCH with one or more other CSI reports.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
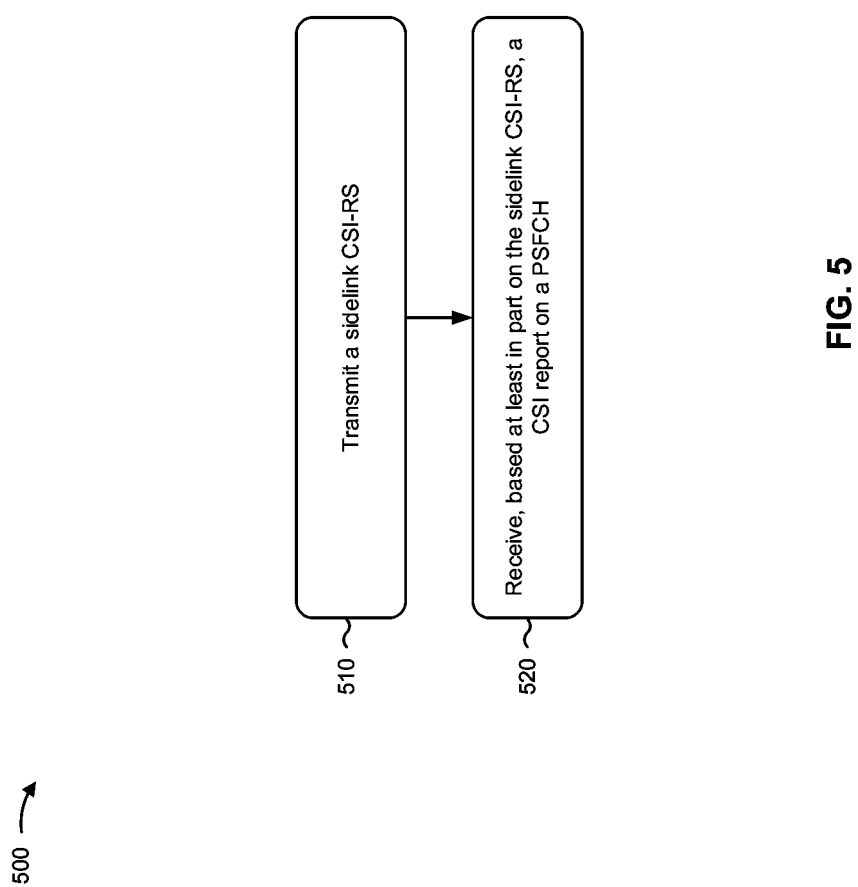

FIG. 5 is a diagram illustrating an example process 500 performed, for example, by a UE, in accordance with various aspects of the present disclosure. Example process 500 is an example where the UE (e.g., UE 120) performs operations associated with techniques for transmitting sidelink CSI feedback.

As shown in FIG. 5, in some aspects, process 500 may include transmitting a sidelink CSI-RS (block 510). For example, the UE (e.g., using antenna 252, MOD 254, transmit processor 264, Tx MIMO processor 266, controller/processor 280, memory 282, transmission component 706 of FIG. 7, and/or the like) may transmit a sidelink CSI-RS, as described above.

As further shown in FIG. 5, in some aspects, process 500 may include receiving, based at least in part on the sidelink CSI-RS, a CSI report on a PSFCH (block 520). For example, the UE (e.g., using antenna 252, DEMOD 254, MIMO detector 256, receive processor 258, controller/processor 280, memory 282, reception component 704 of FIG. 7, and/or the like) may receive, based at least in part on the sidelink CSI-RS, a CSI report on a PSFCH, as described above.

Process 500 may include additional aspects, such as any single aspect or any combination of aspects described below and/or in connection with one or more other processes described elsewhere herein.

In a first aspect, process 500 includes receiving (e.g., using antenna 252, DEMOD 254, MIMO detector 256, receive processor 258, controller/processor 280, memory 282, reception component 704, and/or the like) HARQ feedback on the PSFCH with the CSI report. In a second aspect, alone or in combination with the first aspect, the CSI report comprises a compact CSI report, and the compact CSI report includes one or two bits indicating a channel quality indicator that is based at least in part on the CSI-RS. In a third aspect, alone or in combination with one or more of the first and second aspects, the CSI report comprises a compact CSI report, and the compact CSI report indicates that a non-compact CSI report is to be transmitted on another sidelink channel in a particular set of time-frequency resources.

In a fourth aspect, alone or in combination with one or more of the first through third aspects, the CSI report is in a sequence-based PSFCH format. In a fifth aspect, alone or in combination with one or more of the first through fourth aspects, receiving the CSI report comprises receiving (e.g., using antenna 252, DEMOD 254, MIMO detector 256, receive processor 258, controller/processor 280, memory 282, reception component 704, and/or the like) the CSI report in the sequence-based PSFCH format with repetition across a plurality of symbols. In a sixth aspect, alone or in combination with one or more of the first through fifth aspects, the CSI report comprises a compact CSI report, and the compact CSI report indicates CSI feedback that is differential to a previous compact CSI report.

In a seventh aspect, alone or in combination with one or more of the first through sixth aspects, the CSI report comprises a compact CSI report, and the compact CSI report indicates CSI feedback that is differential to a previous non-compact CSI report. In an eighth aspect, alone or in combination with one or more of the first through seventh aspects, a periodicity of the compact CSI report and a periodicity of the non-compact CSI report are different periodicities. In a ninth aspect, alone or in combination with one or more of the first through eighth aspects, the CSI report is in a non-sequence-based PSFCH format.

In a tenth aspect, alone or in combination with one or more of the first through ninth aspects, the CSI report is in a non-sequence-based PSFCH format that includes a plurality of coded bits of CSI feedback and one or more coded bits of hybrid automatic repeat request feedback. In an eleventh aspect, alone or in combination with one or more of the first through tenth aspects, the CSI report is at least one of time division multiplexed on the PSFCH with one or more other CSI reports or frequency-division multiplexed on the PSFCH with one or more other CSI reports.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
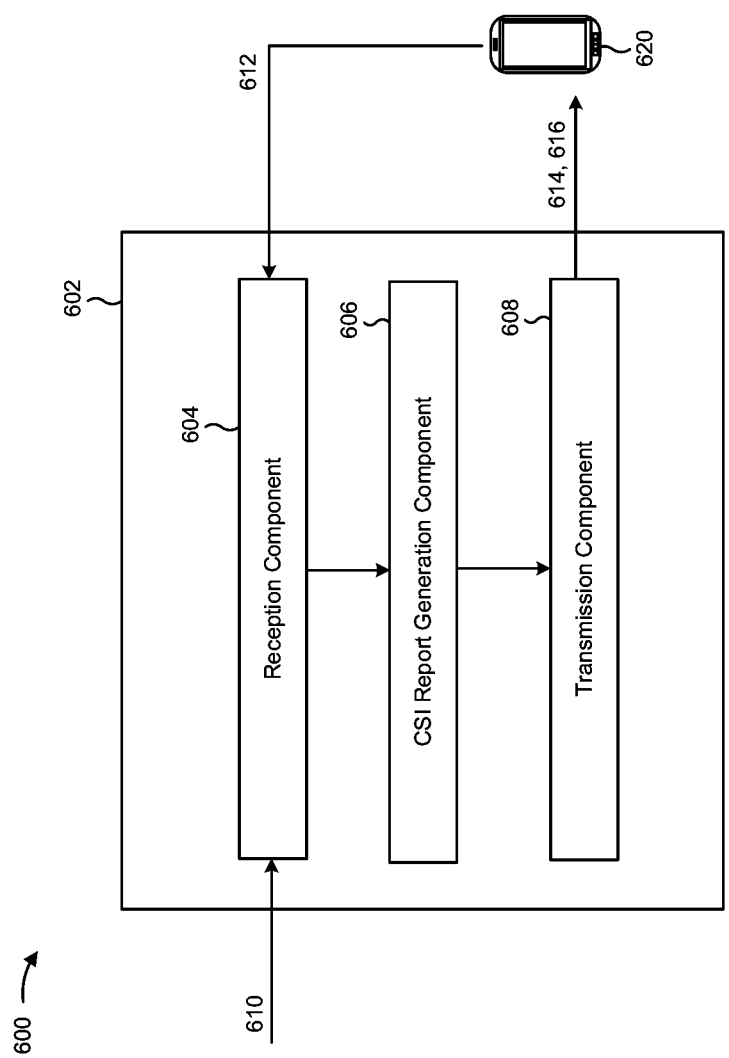
FIGS. 6 and 7 are conceptual data flow diagrams illustrating data flows between different modules/means/components in example apparatuses, in accordance with various aspects of the present disclosure.

FIG. 6 is a conceptual data flow diagram 600 illustrating the data flow between different modules/means/components in an example apparatus 602. The apparatus 602 may be a UE (e.g., UE 120). In some aspects, the apparatus 602 includes a reception component 604, a CSI report generation component 606, a transmission component 608, and/or the like.

In some aspects, reception component 604 may receive a CSI report configuration 610. In some aspects, reception component 604 may receive CSI report configuration 610 from a UE 620 (e.g., UE 120), another UE, a BS (e.g., BS 110), and/or the like. For example, reception component 604 may receive CSI report configuration 610 from UE 620 in a PSBCH communication, a PSCCH communication, an RRC communication, and/or the like. As another example, reception component 604 may receive CSI report configuration 610 from a BS in an RRC communication, in a PDCCH communication, in a DCI communication, in a MAC-CE communication, and/or the like.

In some aspects, reception component 604 may receive a sidelink CSI-RS 612 from UE 620 on a sidelink. For example, reception component 604 may receive sidelink CSI-RS 612 on a PSSCH, a PSCCH, and/or the like. In some aspects, reception component 604 may receive sidelink CSI-RS 612 after receiving CSI report configuration 610. In some aspects, reception component 604 may include an antenna (e.g., antenna 252), a DEMOD (e.g., DEMOD 254), a MIMO detector (e.g., MIMO detector 256), a receive processor (e.g., receive processor 258), a controller/processor (e.g., controller/processor 280), a memory (e.g., memory 282), and/or the like.

In some aspects, CSI report generation component 606 may generate a CSI report 614 based at least in part on sidelink CSI-RS 612. For example, CSI report generation component 606 may perform one or more measurements of sidelink CSI-RS 612 and may generate CSI report 614 based at least in part on the results of the one or more measurements. In some aspects, CSI report generation component 606 may include a receive processor (e.g., receive processor 258), a transmit processor (e.g., transmit processor 264), a controller/processor (e.g., controller/processor 280), a memory (e.g., memory 282), and/or the like.

In some aspects, transmission component 608 may transmit CSI report 614 on a PSFCH to UE 620. In some aspects, the CSI report 614 may be based at least in part on sidelink CSI-RS 612. In some aspects, transmission component 608 may transmit HARQ feedback 616 (e.g., an ACK or a NACK), associated with the sidelink communication received from UE 620, along with CSI report 614. In some aspects, CSI report 614 may include a compact CSI report. In some aspects, the compact CSI report may include CSI feedback, may indicate that a non-compact CSI report is to be transmitted on another sidelink channel to UE 620, and/or the like. In some aspects, transmission component 608 may include an antenna (e.g., antenna 252), a MOD (e.g., MOD 254), a Tx MIMO processor (e.g., TX MIMO processor 266), a transmit processor (e.g., transmit processor 264), a controller/processor (e.g., controller/processor 280), a memory (e.g., memory 282), and/or the like.

The apparatus 602 may include additional components that perform each of the blocks of the algorithm in the aforementioned process 400 of FIG. 4, process 500 of FIG. 5, and/or the like. Each block in the aforementioned process 400 of FIG. 4, process 500 of FIG. 5, and/or the like may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7:
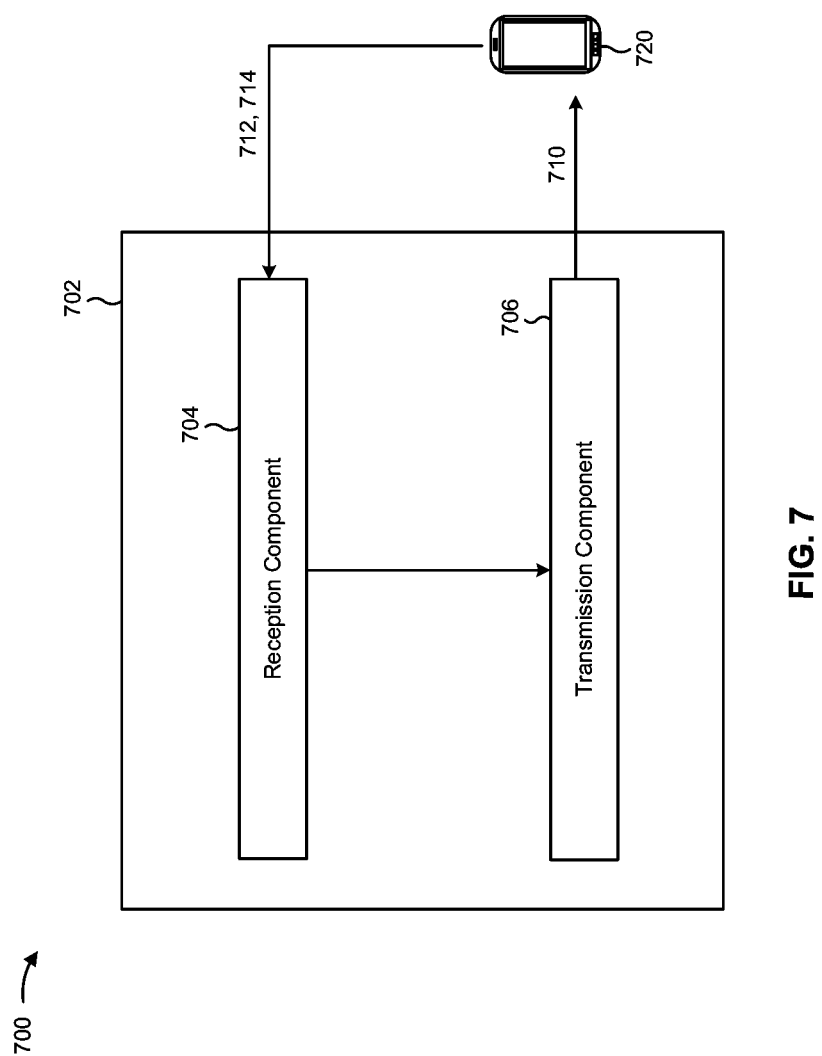

FIG. 7 is a conceptual data flow diagram 700 illustrating the data flow between different modules/means/components in an example apparatus 702. The apparatus 702 may be a UE (e.g., UE 120). In some aspects, the apparatus 702 includes a reception component 704, a transmission component 706, and/or the like.

In some aspects, transmission component 706 may transmit a sidelink CSI-RS 710 to a UE 720 (e.g., UE 120) on a sidelink. For example, transmission component 706 may transmit sidelink CSI-RS 710 on a PSSCH, a PSCCH, and/or the like. In some aspects, transmission component 706 may transmit a sidelink communication to UE 720. The sidelink communication may be associated with sidelink CSI-RS 710. In some aspects, transmission component 706 may include an antenna (e.g., antenna 252), a MOD (e.g., MOD 254), a Tx MIMO processor (e.g., TX MIMO processor 266), a transmit processor (e.g., transmit processor 264), a controller/processor (e.g., controller/processor 280), a memory (e.g., memory 282), and/or the like.

In some aspects, reception component 704 may receive a CSI report 712 on a PSFCH from UE 720. In some aspects, the CSI report 614 may be based at least in part on sidelink CSI-RS 710. In some aspects, reception component 704 may receive HARQ feedback 714 (e.g., an ACK or a NACK), associated with the sidelink communication transmitted to UE 720, along with CSI report 712. In some aspects, CSI report 712 may include a compact CSI report. In some aspects, the compact CSI report may include CSI feedback, may indicate that a non-compact CSI report is to be transmitted on another sidelink channel to apparatus 702, and/or the like. In some aspects, reception component 704 may include an antenna (e.g., antenna 252), a DEMOD (e.g., DEMOD 254), a MIMO detector (e.g., MIMO detector 256), a receive processor (e.g., receive processor 258), a controller/processor (e.g., controller/processor 280), a memory (e.g., memory 282), and/or the like.

The apparatus 702 may include additional components that perform each of the blocks of the algorithm in the aforementioned process 400 of FIG. 4, process 500 of FIG. 5, and/or the like. Each block in the aforementioned process 400 of FIG. 4, process 500 of FIG. 5, and/or the like may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving a sidelink channel state information (CSI) reference signal (CSI-RS); and
    transmitting, based at least in part on the sidelink CSI-RS, a compact CSI report on a physical sidelink feedback channel (PSFCH),
        wherein the compact CSI report is one or two bits in size and indicates that a non-compact CSI report is to be transmitted on another sidelink channel in a particular set of time-frequency resources.

2. The method of claim 1, further comprising:
    receiving a CSI report configuration in at least one of:
        a radio resource control (RRC) communication from a network entity,
        an RRC communication from another UE,
        a physical sidelink broadcast channel communication, or
        a physical sidelink control channel communication; and
    wherein transmitting the compact CSI report comprises:
        transmitting the compact CSI report based at least in part on the CSI report configuration.

3. The method of claim 2, wherein the CSI report configuration indicates that the compact CSI report is to be transmitted.

4. The method of claim 3, further comprising:
    transmitting hybrid automatic repeat request feedback on the PSFCH with the compact CSI report.

5. The method of claim 1,
    wherein the compact CSI report includes a channel quality indicator that is based at least in part on the sidelink CSI-RS.

6. The method of claim 1, wherein the compact CSI report is in a sequence-based PSFCH format.

7. The method of claim 6, wherein transmitting the compact CSI report comprises:
    transmitting the compact CSI report in the sequence-based PSFCH format with repetition across a plurality of symbols.

8. The method of claim 1,
    wherein the compact CSI report indicates CSI feedback that is differential to a previous compact CSI report.

9. The method of claim 1,
    wherein the compact CSI report indicates CSI feedback that is differential to a previous non-compact CSI report.

10. The method of claim 9, wherein a periodicity of the compact CSI report and a periodicity of the previous non-compact CSI report are different periodicities.

11. The method of claim 1, wherein the compact CSI report is in a non-sequence-based PSFCH format.

12. The method of claim 1, wherein the compact CSI report is in a non-sequence-based PSFCH format that includes:
    a coded bit of CSI feedback, and
    a coded bit of hybrid automatic repeat request feedback.

13. The method of claim 1, wherein the compact CSI report is at least one of:
    time division multiplexed on the PSFCH with one or more other CSI reports, or
    frequency-division multiplexed on the PSFCH with one or more other CSI reports.

14. A method of wireless communication performed by a user equipment (UE), comprising:
    transmitting a sidelink channel state information (CSI) reference signal (CSI-RS); and
    receiving, based at least in part on the sidelink CSI-RS, a compact CSI report on a physical sidelink feedback channel (PSFCH),
        wherein the compact CSI report is one or two bits in size and indicates that a non-compact CSI report is to be transmitted on another sidelink channel in a particular set of time-frequency resources.

15. The method of claim 14, further comprising:
    receiving hybrid automatic repeat request feedback on the PSFCH with the compact CSI report.

16. The method of claim 14,
    wherein the compact CSI report includes a channel quality indicator that is based at least in part on the sidelink CSI-RS.

17. The method of claim 14, wherein the compact CSI report is in a sequence-based PSFCH format.

18. The method of claim 17, wherein receiving the compact CSI report comprises:
    receiving the compact CSI report in the sequence-based PSFCH format with repetition across a plurality of symbols.

19. The method of claim 14,
wherein the compact CSI report indicates CSI feedback that is differential to a previous compact CSI report.

20. The method of claim 14,
wherein the compact CSI report indicates CSI feedback that is differential to a previous non-compact CSI report.

21. The method of claim 20, wherein a periodicity of the compact CSI report and a periodicity of the previous non-compact CSI report are different periodicities.

22. The method of claim 14, wherein the compact CSI report is in a non-sequence-based PSFCH format.

23. The method of claim 14, wherein the compact CSI report is in a non-sequence-based PSFCH format that includes:
a coded bit of CSI feedback, and
a coded bit of hybrid automatic repeat request feedback.

24. The method of claim 14, wherein the compact CSI report is at least one of:
time division multiplexed on the PSFCH with one or more other CSI reports, or
frequency-division multiplexed on the PSFCH with one or more other CSI reports.

25. A user equipment (UE) for wireless communication, comprising:
a memory; and
one or more processors coupled to the memory, the one or more processors configured to:
receive a sidelink channel state information (CSI) reference signal (CSI-RS); and
transmit, based at least in part on the sidelink CSI-RS, a compact CSI report on a physical sidelink feedback channel (PSFCH),
wherein the compact CSI report is one or two bits in size and indicates that a non-compact CSI report is to be transmitted on another sidelink channel in a particular set of time-frequency resources.

26. A user equipment (UE) for wireless communication, comprising:
a memory; and
one or more processors coupled to the memory, the one or more processors configured to:
transmit a sidelink channel state information (CSI) reference signal (CSI-RS); and
receive, based at least in part on the sidelink CSI-RS, a compact CSI report on a physical sidelink feedback channel (PSFCH),
wherein the compact CSI report is one or two bits in size and indicates that a non-compact CSI report is to be transmitted on another sidelink channel in a particular set of time-frequency resources.

27. The UE of claim 26, wherein the one or more processors are further configured to:
receive hybrid automatic repeat request feedback on the PSFCH with the compact CSI report.

28. The UE of claim 25, wherein the one or more processors are further configured to:
receive a CSI report configuration in at least one of:
a radio resource control (RRC) communication from a network entity,
an RRC communication from another UE,
a physical sidelink broadcast channel communication, or
a physical sidelink control channel communication; and
wherein the one or more processors, to transmit the compact CSI report, are configured to:
transmit the compact CSI report based at least in part on the CSI report configuration.

29. The UE of claim 25, wherein the one or more processors, to transmit the compact CSI report, are configured to:
transmit the compact CSI report in a sequence-based PSFCH format with repetition across a plurality of symbols.

30. The UE of claim 26, wherein the one or more processors, to receive the compact CSI report, are configured to:
receive the compact CSI report in a sequence-based PSFCH format with repetition across a plurality of symbols.

* * * * *